United States Patent
Zhao et al.

(10) Patent No.: US 11,036,208 B2
(45) Date of Patent: Jun. 15, 2021

(54) EQUIPMENT MONITORING MANAGEMENT METHOD AND SYSTEM

(71) Applicant: Wistron Corp., New Taipei (TW)

(72) Inventors: Zong-Shui Zhao, New Taipei (TW); Wenyu Bao, New Taipei (TW)

(73) Assignee: Wistron Corp., New Taipei (TW)

( * ) Notice: Subject to any disclaimer, the term of this patent is extended or adjusted under 35 U.S.C. 154(b) by 139 days.

(21) Appl. No.: 16/405,930

(22) Filed: May 7, 2019

(65) Prior Publication Data

US 2020/0218236 A1 Jul. 9, 2020

(30) Foreign Application Priority Data

Jan. 8, 2019 (CN) .......................... 201910016352.9

(51) Int. Cl.
*G05B 19/418* (2006.01)
*G05B 19/042* (2006.01)

(52) U.S. Cl.
CPC ..... *G05B 19/4183* (2013.01); *G05B 19/0425* (2013.01); *G05B 19/4185* (2013.01); *G05B 2219/25071* (2013.01)

(58) Field of Classification Search
CPC .......................... G05B 19/0425; G05B 19/4185
See application file for complete search history.

(56) References Cited

U.S. PATENT DOCUMENTS

| | | | |
|---|---|---|---|
| 2019/0043003 A1* | 2/2019 | Fisher | G01S 3/00 |
| 2020/0074394 A1* | 3/2020 | Fisher | G06T 7/70 |
| 2020/0096349 A1* | 3/2020 | Black | G01C 21/3679 |
| 2020/0183354 A1* | 6/2020 | Atsumi | G06Q 50/04 |

FOREIGN PATENT DOCUMENTS

TW 201807680 A 3/2018

* cited by examiner

*Primary Examiner* — Anil K Bhargava

(57) ABSTRACT

An equipment monitoring management method includes the following steps. A positioned picture layer including a base map divided into a plurality of grids is provided, wherein each of the grids has a first coordinate value and the base map of the positioned picture layer corresponds to the site layout. A first set file including an equipment identifier and a second coordinate value corresponding to the equipment identifier is generated by receiving an input of relevant equipment information. The second coordinate value corresponding to the equipment identifier is compared with the first coordinate values according to the first set file to determine the grid associated with the second coordinate value corresponding to the equipment identifier and an equipment icon is generated according to the equipment identifier or equipment name. The equipment icon is displayed on the grid associated with the second coordinate value corresponding to the equipment identifier.

21 Claims, 9 Drawing Sheets

EQUIPMENT MONITORING MANAGEMENT METHOD AND SYSTEM

CROSS REFERENCE TO RELATED APPLICATIONS

This application claims priority of China Patent Application No. 201910016352.9, filed on Jan. 8, 2019, the entirety of which is incorporated by reference herein.

BACKGROUND OF THE INVENTION

Field of the Invention

The present invention relates to a monitoring management method and system, and in particular it relates to an equipment monitoring management method and system suitable to remotely monitor the operation state of a plurality of equipment.

Description of the Related Art

With the widespread application of Internet of Things (IoT) technology, many companies and factories perform network monitoring for production equipment, detection equipment, or equipment for providing services. The key performance indicators (KPI) of the state and operation of the equipment may be displayed on the user interface of a back-end monitoring system in real-time. However, according to the requirements of practical production, detection, and service, the companies or factories may add, transfer, or scrap some equipment. Alternatively, the companies or factories may change the position and location in which the equipment is placed according to the requirements of the production, the detection, and the service. Therefore, the position of the equipment displayed on the user interface of the monitoring system needs to be changed accordingly.

However, after each time the equipment is updated, the user needs to re-draw the distribution map of the equipment. Then, the new distribution map is uploaded to the user interface by the system development and maintenance staff. This process lacks flexibility and timeliness. Therefore, how to effectively increase the flexibility and timeliness of monitoring and management has become the focus for technical improvements by various manufacturers.

BRIEF SUMMARY OF THE INVENTION

An embodiment of the present invention provides an equipment monitoring management method and system, thereby increasing the flexibility and timeliness of enterprise or equipment monitoring and management.

An embodiment of the present invention provides an equipment monitoring management method, which includes the following steps. A positioned picture layer is provided, wherein the positioned picture layer includes a base map divided into a plurality of grids. Each of the grids has a first coordinate value. The base map of the positioned picture layer corresponds to the site layout. A first set file is generated by receiving an input of relevant equipment information. The first set file includes an equipment identifier and a second coordinate value corresponding to the equipment identifier. The second coordinate value corresponding to the equipment identifier is compared with the first coordinate values according to the first set file to determine the grid associated with the second coordinate value corresponding to the equipment identifier, and an equipment icon is generated according to the equipment identifier or equipment name. The equipment icon is displayed on the grid associated with the second coordinate value corresponding to the equipment identifier.

In addition, an embodiment of the present invention provides an equipment monitoring management system, which includes a picture layer generator, a setting equipment, a processor and display equipment. The picture layer generator provides a positioned picture layer, wherein the positioned picture layer includes a base map divided into a plurality of grids. Each of the grids has a first coordinate value. The base map of the positioned picture layer corresponds to the site layout. The setting equipment generates a first set file by receiving an input of relevant equipment information, wherein the first set file includes an equipment identifier and a second coordinate value corresponding to the equipment identifier. The processor compares the second coordinate value corresponding to the equipment identifier with the first coordinate values according to the first set file to determine the grid associated with the second coordinate value corresponding to the equipment identifier and generates an equipment icon according to the equipment identifier or equipment name. The display equipment displays the equipment icon on the grid associated with the second coordinate value corresponding to the equipment identifier.

According to the equipment monitoring management method and system disclosed by the embodiment of the present invention, the positioned picture layer including the base map divided into a plurality of grids is provided and each of the grids has a first coordinate value. The first set file including the equipment identifier and the second coordinate value corresponding to the equipment identifier is generated by receiving the input of relevant equipment information. The second coordinate value corresponding to the equipment identifier is compared with the first coordinate values according to the first set file to determine the grid associated with the second coordinate value corresponding to the equipment identifier. The equipment icon is generated according to the equipment identifier or the equipment name. The equipment icon is displayed on the grid associated with the second coordinate value corresponding to the equipment identifier. Therefore, the flexibility and timeliness of the equipment monitoring and management may be effectively increased and the convenience of the use is increased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component. The equipment monitoring management system and method provided by the embodiment of the present invention are described in the following embodiments as examples of the application of the factory for manufacturing products, but are not limited thereto.

Figure 1:
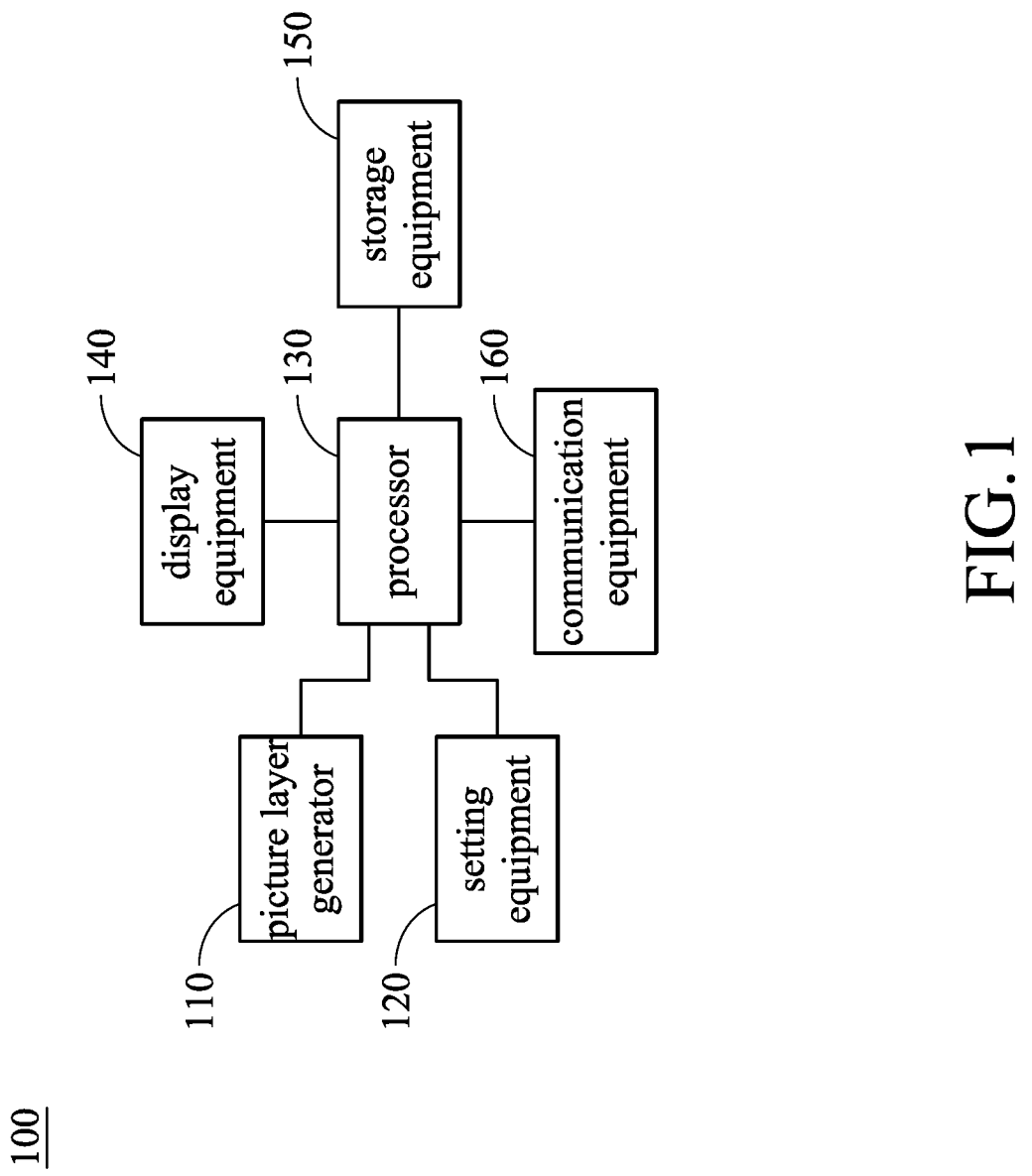
FIG. 1 shows a schematic view of an equipment monitoring management system according to an embodiment of the present invention.

FIG. 1 shows a schematic view of an equipment monitoring management system according to an embodiment of the present invention. Please refer to FIG. 1, the equipment monitoring management system 100 includes a picture layer generator 110, setting equipment 120, a processor 130, display equipment 140, storage equipment 150 and communication equipment 160. The equipment monitoring management system 100 may be computing equipment with a network communication function, such as a smartphone, a tablet computer, a laptop computer, a desktop computer, a server, etc.

The processor 130 may be a general-purpose processor, a micro control unit (MCU), an application processor (AP), a digital signal processor (DSP), etc. The processor 130 may include various circuit logic for providing functions of data processing and computing, controlling the operation of communication equipment 160 to provide network connections, reading or storing data from storage equipment 150, and receiving or outputting signals from the input and output equipment. In particular, the processor 130 is configured to coordinate the operation of the communication equipment 160, the storage equipment 150 and the input and output equipment to perform the equipment monitoring management method of embodiments in the present application. In particular, the storage equipment 150 further stores the program codes of the equipment monitoring management method of embodiments in the present application and the program codes are loaded and performed by the processor 130. The communication equipment 160 is configured to provide a network connection to a network, and may further be connected to equipment in the factory and the remote server through the network. The communication equipment 160 may provide the network connection through a wire manner, such as Ethernet, optical fiber network, asymmetric digital subscriber line (ADSL), etc. Alternatively, the communication equipment 160 may also provide the network connection through a wireless manner, such as wireless fidelity (WiFi) technology, or other telecommunication network technologies. However, in other embodiments of the present invention, the communication equipment 160 may be connected to the plurality of equipment in the factory through other transmission protocols and transmission channels of other non-network communication protocols.

Figure 2A:
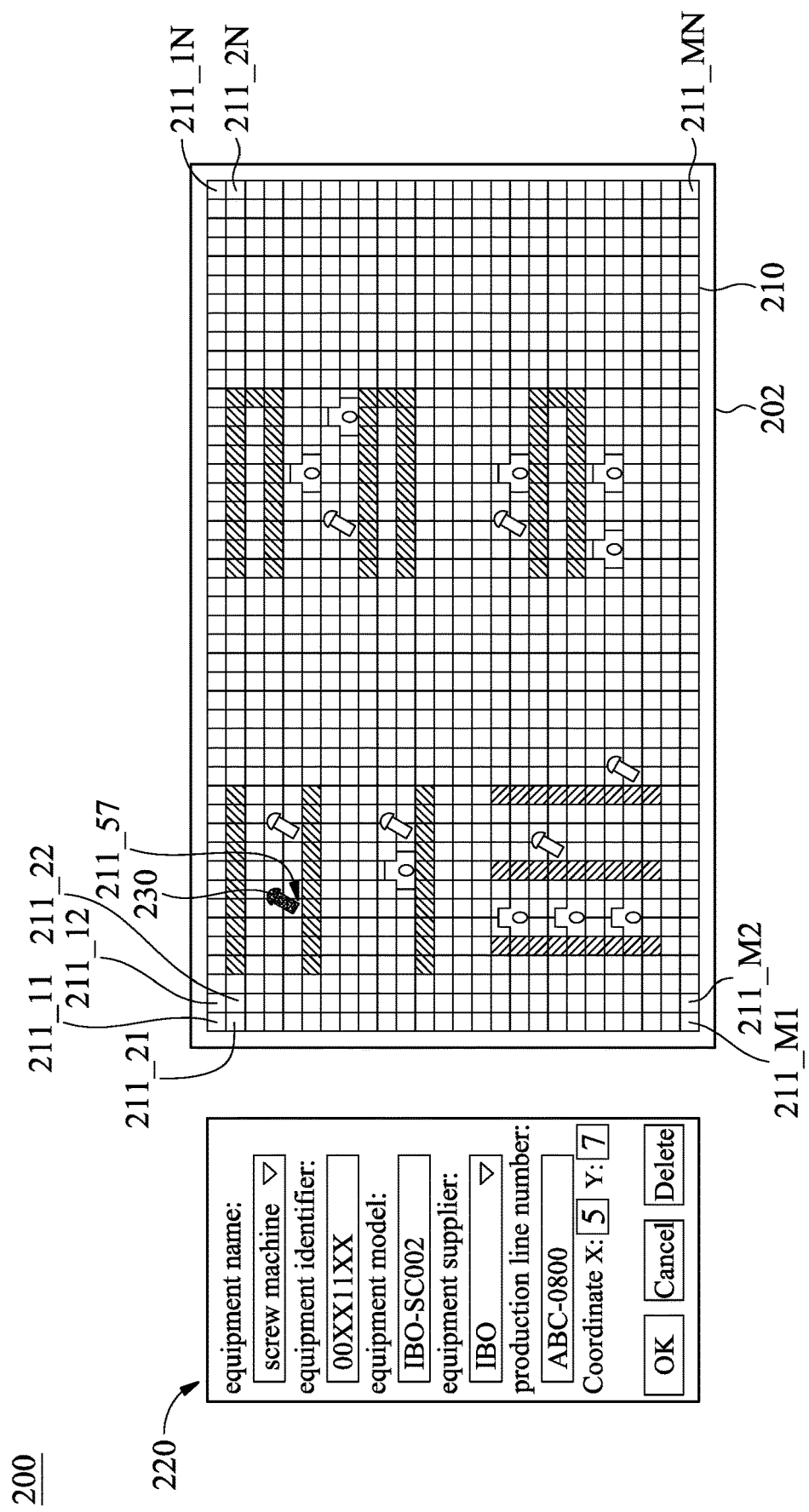
FIG. 2A shows a schematic view of a user interface according to an embodiment of the present invention.

The picture layer generator 110 provides a positioned picture layer 202, and the positioned picture layer 202 includes a base map 210, as shown in FIG. 2A. For example, the base map 210 provided by the picture layer generator 110 may be presented on a user interface 200 of the display equipment 140, and the base map 210 may correspond to a site layout of the factory. Further, the base map 210 may be proportional to the site layout of the factory, or the base map 210 may be similar to the site layout of the factory, or the base map 210 is simply a schematic layout of the site shape of the factory. In an embodiment of the present invention, the positioned picture layer 202 may include the site layout of the factory, and the base map 210 may be stacked on the site layout of the factory. Therefore, the user may monitor and manage the state of the equipment of the factory through the content displayed on the base map 210.

In some embodiments, the picture layer generator 110 may be an application program performed by the processor 130. That is, after the picture layer generator 110 is performed by the processor 130, the positioned picture layer 202 including the base map 202 presented on the user interface 200 is provided. In some embodiments, the picture layer generator 110 is an equipment or a device that is independent of processor 130 and the picture layer generator 110 may provide the positioned picture layer 202 including the base map 210 presented on the user interface 200.

The picture layer generator 110 may divide the base map 210 into a plurality of grids, so that the base map 210 includes the grids 211_11, 211_12, ..., 211_1N, 211_21, 211_22, ..., 211_2N, 211_M1, 211_M2, ..., 211_MN, wherein N and M are positive integers greater than 1. In the embodiment, N and M may be the same or different. The user may adjust the numbers of N and M according the requirement thereof to conform with or similar to the site layout of the factory. The grids 211_11 to 211_MN may be presented on the user interface 200, for example, in a manner similar to a checkerboard or lattice.

In addition, after the base map 210 is divided into grids 211_11 to 211_MN, the positioned layer generator 110 may set coordinates for the grids 211_11 to 211_MN, so that each of the grids 211_11 to 211_MN includes a first coordinate value.

The first coordinate value corresponding to the grid 211_11 is, for example, (X, Y)=(1, 1), the first coordinate value corresponding to the grid 211_12 is, for example, (X, Y)=(1, 2), ..., the first coordinate value corresponding to the grid 211_1N is, for example, (X, Y)=(1, N), the first coordinate value corresponding to the grid 211_21 is for example, (X, Y)=(2, 1), the first coordinate value corresponding to the grid 211_22 is, for example, (X, Y)=(2, 2), ..., the first coordinate value corresponding to the grid 211_2N is, for example, (X, Y)=(2, N), the first coordinate value corresponding to the grid 211_M1 is, for example, (X, Y)=(M, 1), the first coordinate value corresponding to the grid 211_M2 is, for example, (X, Y)=(M, 2), ..., the first coordinate value corresponding to the grid 211_MN, is for, example, (X, Y)=(M, N). In the embodiment, X is, for example, an ordinate, and Y is, for example, an abscissa.

The setting equipment 120 may generate a first set file by receiving an input of relevant equipment information, wherein the first set file at least includes an equipment identifier and a second coordinate value corresponding to the equipment identifier. In the embodiment, the equipment identifier is any identifier used to identify different equipment, such as a unique identifier (UID) of the equipment or a property number, etc.

In some embodiments, the setting equipment 120 may display an editing interface 220 on the user interface 202. The editing interface 220 may at least include an equipment identifier field and a coordinate field, so that the user may input the equipment identifier and the coordinate value through the equipment identifier field and the coordinate field (X, Y) of the editing interface 220. After the user presses an "OK" button, the setting equipment 120 may correspondingly generate the first set file, and the first set file may include the equipment identifier and the second coordinate value corresponding to the equipment identifier. It is assumed that the equipment identifier is "00XX11XX" and the second coordinate value is, for example, (X, Y)=(5, 7).

Further, the editing interface 220 may also include other editing fields, such as the equipment name field, an equipment model field, an equipment supplier field, a production line number field, etc. That is, the user may input or select (such as a pull-down menu) the equipment name, the equipment model, the equipment supplier and the production line number through the above fields of the editing interface 220. Accordingly, the first set file generated by the setting equipment 120 also includes messages of the equipment name, the equipment model, the equipment supplier and the production line number.

In some embodiments, the setting equipment 120 may be an application program performed by the processor 130. That is, after the setting equipment 120 is performed by the processor 130, the setting equipment 120 provides the first set file. In some embodiments, the setting equipment 120 is an equipment or a device that is independent of processor 130 and the setting equipment 120 is used to provide the first set file.

The processor 130 receives the related information of the base map 210 and the first set file. Then, the processor 130 may compare the second coordinate value of the first set file with the first coordinate values of grids 211_11 to 211_MN of the base map 210 according to the first set file to search and determine the grid associated with the second coordinate value.

For example, after the processor 130 obtain the first set file, the processor 130 may obtain the equipment identifier and the second coordinate value (i.e., (X, Y)=(5, 7)) corresponding to the equipment identifier from the first set file. Then, the processor 130 may find the corresponding first coordinate value (i.e., (X, Y)=(5, 7)) in the base map 210 according to the second coordinate value. Afterward, the processor 130 obtains the grid (such as the grid 211_57) corresponding to the first coordinate value according the obtained first coordinate value (i.e., (X, Y)=(5, 7)). Therefore, the processor 130 may determine that the grid 211_57 is associated with the second coordinate value (i.e., (X, Y)=(5, 7)) corresponding to the equipment identifier.

Then, in some embodiments, the processor 130 may generate an equipment icon 230 according to the equipment name. That is, when the user input or select the equipment name in the editing interface 220, the processor 130 may find the equipment icon corresponding to the equipment name in a database according to the equipment name. In addition, in some embodiments, the processor 130 may generate the equipment icon 230 according to the equipment identifier. That is, when the user input the equipment identifier in the editing interface 220, the processor 130 may find the equipment name corresponding to the equipment identifier in the database according to the equipment identifier and then find the equipment icon corresponding to the equipment name according to the equipment name. In the embodiment, the above equipment icon may include equipment icons corresponding to the equipment, such as a screw machine, an inspection machine, a labeling machine, a sealing machine, an assembly machine, a hot melt machine, etc. In addition, the above database may be configured in the server.

The different equipment has different equipment identifier or different equipment name, and different equipment also corresponds to different equipment icon. For example, the equipment icon 230 corresponding to the screw machine may be shown in FIG. 2C, and the equipment icon 230 corresponding to the inspection machine may be shown in FIG. 2D. The equipment icon mentioned above is one exemplary embodiment of the embodiment of the present invention, but not intended to limit the embodiment of the present invention. The user may design or adjust the content of the equipment icon according to the requirement thereof, which belongs the protection scope of the embodiment of the present invention.

The display equipment 140 is coupled to the processor 130 and displays the equipment icon 230 on the grid 211_57 associated with the second coordinate value corresponding to the equipment identifier. That is, after the processor 130 determines the grid 211_57 associated with the second coordinate value corresponding to the equipment identifier and generates the equipment icon 230, the processor 130 may display the equipment icon 230 on the grid 211_57 through the display equipment 140.

Each of the equipment icons 230 that have been set and displayed on the display equipment 140 is bounded to the messages (such as the equipment identifier, the coordinate value, the equipment name, the equipment model, the equipment supplier, the production line number, etc.) of a certain equipment. Accordingly, the user may move the cursor of the mouse to a certain equipment icon 230, so that the user interface 200 may display the messages, such as the equipment identifier, the coordinate value, the equipment name, the equipment model, the equipment supplier, the production line number, etc. Alternatively, the user may operate the cursor of the mouse to click the certain equipment icon 230, so as to display the operation state information of the equipment, such as the real-time image of the operation of the equipment. Therefore, the user may effectively monitor and manage the equipment.

Furthermore, in one embodiment of the present invention, after the processor 130 obtains the equipment identifier and the corresponding second coordinate value from the first set file, the processor 130 may determine whether the equipment identifier and/or the second coordinate value are correct. In the embodiment, the processor 130 determines the equipment identifier and/or the second coordinate value through the database. That is, the processor 130 determines that whether the equipment identifier conforms to a pre-stored identifier of a database, whether the second coordinate value is already used and/or whether the second coordinate value is located in the base map 210.

For example, the equipment identifiers for all equipment may be set as pre-stored identifiers and the pre-stored identifiers are stored in the database. Accordingly, after the processor 130 obtains the equipment identifier, the processor 130 may compare the equipment identifier with the pre-stored identifier in the database to determine whether the equipment identifier conforms to the pre-stored identifier. When the equipment identifier conforms to the pre-stored identifier, it indicates the equipment corresponding to the equipment identifier is equipment that is within the organization, and the processor 130 may determine that the identifier is correct. When the equipment identifier does not conform to the pre-stored identifier, it indicates that the equipment corresponding to the equipment identifier is not the equipment within the organization, and the processor 130 may determine that the identifier is wrong.

When it is determined that the second coordinate value is not used, it indicates that the second coordinate value is not used to display the equipment icon, and the processor 130 may determine that the second coordinate value is correct. When it is determined that the second coordinate value is already used, it indicates that the second coordinate value is already used to display the equipment icon, and the processor 130 may determine that the second coordinate value is wrong.

When it is determined that the second coordinate value is located in the base map 210, it indicates that the second coordinate value is a coordinate value within the base map 210, and the processor 130 may determine that the second coordinate value is correct. When it is determined that the second coordinate value is not located in the base map 210, it indicates that the second coordinate value exceeds a range of the base map 210 or is not a coordinate value set within the base map 210, and the processor 130 may determine that the second coordinate value is wrong.

When the processor 130 determines that the equipment identifier is wrong, the second coordinate value is wrong, or both of the equipment identifier and the second coordinate value are wrong, the processor 130 may generate a warning message in response to the wrong equipment identifier and/or the wrong second coordinate value. The warning message indicates that the content inputted by the user may not be stored or is invalid. Then, the processor 130 may display the warning message on the user interface 200 by a window through the display equipment 140. Therefore, the user may know that the inputted equipment identifier or the inputted second coordinate value is wrong through the warning message, and the user needs to re-input the equipment identifier or the second coordinate value.

In addition, when the processor 130 determines that the equipment identifier and the second coordinate value are correct, the processor 130 may compare the second coordinate value with the first coordinate values to determine the grid associated with the second coordinate value corresponding to the equipment identifier in response to the correct equipment identifier and the correct second coordinate value. The processor 130 generates the equipment icon according to the equipment name or the equipment identifier, and binds the message, such as the equipment identifier. Then, the equipment icon is displayed on the grid associated with the second coordinate value corresponding to the equipment identifier.

Furthermore, when the user needs to replace the position of the equipment icon 230, the user may input the equipment identifier "00XX11XX" and a third coordinate value (such as (X, Y)=(11, 4)) through the editing interface 220 or directly replace the coordinate to the third coordinate value through the editing interface 220 appeared after clicking the equipment icon by the mouse cursor. After the user presses an "OK" button, the setting equipment 120 may correspondingly generate the second set file (i.e., the updated set file), and the second set file may include the equipment identifier "00XX11XX" and the third coordinate value ((X, Y)=(11, 4)). In the embodiment, the second set file is used for replacing the position of the equipment icon 230.

After the processor 130 obtains the second set file, the processor 130 may obtain the third coordinate value (i.e., (X, Y)=(11, 4)) from the second set file. Then, the processor 130 may correspondingly find the first coordinate value (i.e., (X, Y)=(11, 4)) in the base map 210 according to the third coordinate value. Afterward, the processor 130 obtains the grid (such as the grid 211_114) corresponding to the first coordinate value according to the obtained first coordinate value ((X, Y)=(11, 4)). Therefore, the processor 130 may determine that the grid 211_114 associates with the third coordinate value ((X, Y)=(11, 4)) corresponding to the equipment identifier.

Figure 2B:
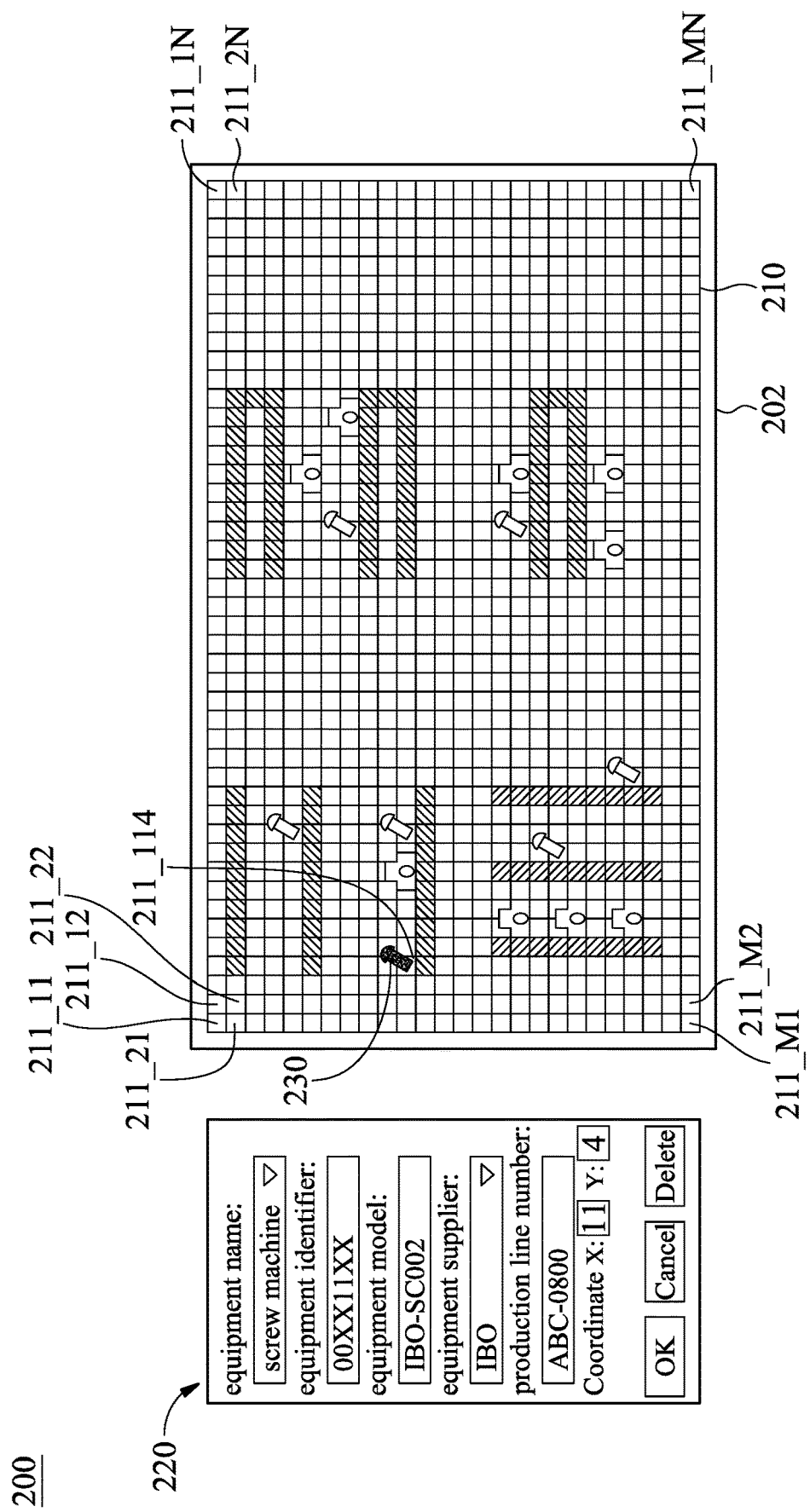
FIG. 2B shows a schematic view of a user interface according to another embodiment of the present invention.
Figure 2C:
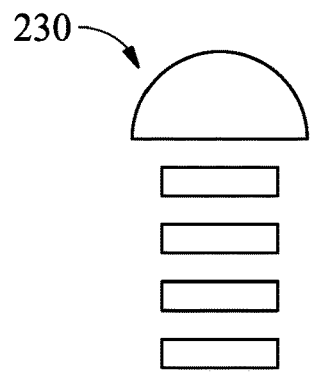
FIG. 2C shows a schematic view of an equipment icon according to an embodiment of the present invention.
Figure 2D:
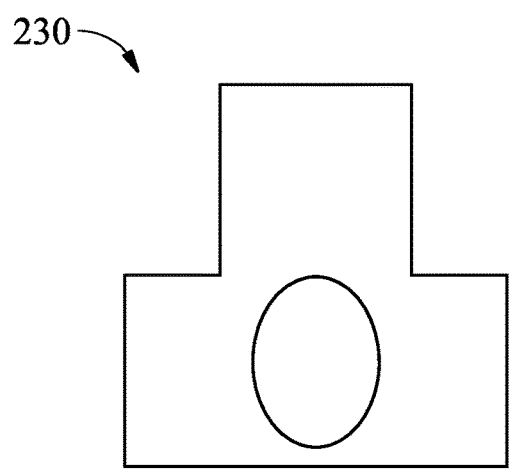
FIG. 2D shows a schematic view of an equipment icon according to an embodiment of the present invention.

After the processor 130 determines the grid 211_114 associated with the third coordinate value ((X, Y)=(11, 4)), the processor 130 may display the equipment icon 230 on the grid 211_114 associated with the third coordinate value ((X, Y)=(11, 4)) through the display equipment 140 and delete the equipment icon 230 displayed on the grid 211_57 associated with the second coordinate value ((X, Y)=(5, 7)) corresponding to the equipment identifier, as shown in FIG. 2B. Therefore, the user may see that equipment icon 230 is replaced by the grid 211_57 (as shown in FIG. 2A) to the grid 211_114 (as shown in FIG. 2B) on the user interface 200.

Furthermore, after the processor 130 obtains the third coordinate value from the second set file, the processor 130 may determine whether the third coordinate value is correct. In the embodiment, the processor 130 determines the third coordinate value through the database. That is, the processor 130 determines that whether the third coordinate value is already used and/or whether the third coordinate value is located in the base map 210.

When the processor 130 determines that the third coordinate value is wrong, the processor 130 may generate a warning message in response to the wrong third coordinate value. Then, the processor 130 may display the warning message on the user interface 200 by a window through the display equipment 140. Therefore, the user may know that the inputted third coordinate value is wrong through the warning message, and the user needs to re-input the third coordinate value.

In addition, when the processor 130 determines that the third coordinate value is correct, the processor 130 may compare the third coordinate value with the first coordinate value to determine the grid associated with the third coordinate value in response to the correct third coordinate value. Then, the equipment icon 230 is displayed on the grid associated with the third coordinate value and the equipment icon 230 displayed on the grid associated with the second coordinate value corresponding to the equipment identifier is deleted.

In the above embodiments, the user performs an editing operation through the editing interface 220 provided by the setting equipment 120, so to generate the second set file to the processor 130. Accordingly, the processor 130 replaces the display position of the equipment icon 230 from the grid 211_57 to the grid 211_114 according to the second set file. However, the embodiments of the present invention are not limited thereto. The user may also replace the display position of the equipment icon 230 from the grid 211_57 to the grid 211_114 by directly dragging the mouse cursor of the mouse, thereby achieving the same display effect and increasing the convenience of use.

Furthermore, after the equipment icon 230 is added to the corresponding grid (such as the grid 211_57), the processor 130 may timely or periodically obtain the equipment operation state of the equipment corresponding to the equipment identifier "00XX11XX" in the database through the communication equipment 160 according to the equipment identifier "00XX11XX". That is, the equipment corresponding to the equipment identifier "00XX11XX" in the factory may upload the operation state thereof to the database through the wire network or the wireless network or other data channels. Each of the data uploaded to the database by the equipment may have the equipment identifier "00XX11XX". Therefore, the processor 130 may correspondingly obtain the equipment operation state in the database according to the equipment identifier "00XX11XX". In the embodiment, the equipment operation state includes shutdown, normal operation, idle, malfunction, etc.

Then, after the processor 130 obtains the equipment operation state corresponding to the equipment identifier, the processor 130 may correspondingly display the equipment operation state on the equipment icon 230. In the embodiment, the processor 130 may display the equipment operation state on the equipment icon 230 through a color, a number, a shape or a symbol.

For example, in one embodiment of the present invention, when the equipment operation state is shutdown, the corresponding equipment icon 230 may display, for example, gray. When the equipment operation state is normal operation, the corresponding equipment icon 230 may display, for example, green. When the equipment operation state is idle, the corresponding equipment icon 230 may display, for example, yellow. When the equipment operation state is malfunction, the corresponding equipment icon 230 may display, for example, red.

Figure 2E:
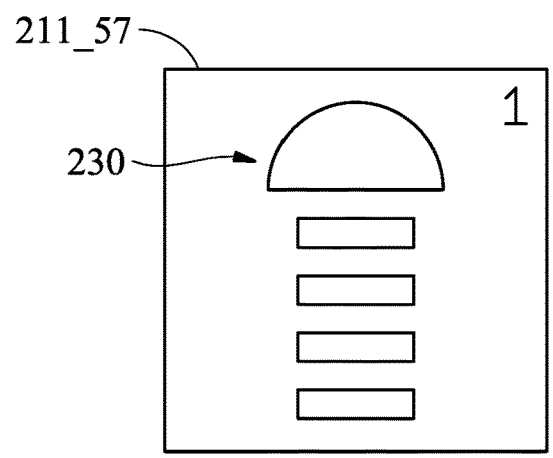
FIG. 2E shows a schematic view of an equipment operation state displayed on the equipment icon according to an embodiment of the present invention.

In another embodiment of the present invention, when the equipment operation state is shutdown, the corresponding equipment icon 230 may display, for example, a number "1", as shown in FIG. 2E. When the equipment operation state is normal operation, the corresponding equipment icon 230 may display, for example, a number "2", which may refer to the display manner of FIG. 2E. When the equipment operation state is idle, the corresponding equipment icon 230 may display, for example, a number "3", which may refer to the display manner of FIG. 2E. When the equipment operation state is malfunction, the corresponding equipment icon 230 may display, for example, a number "4", which may refer to the display manner of FIG. 2E.

In another embodiment of the present invention, when the equipment operation state is shutdown, the corresponding equipment icon 230 may display, for example, a "rectangle", which may refer to the display manner of FIG. 2E. When the equipment operation state is normal operation, the corresponding equipment icon 230 may display, for example, a "circle", which may refer to the display manner of FIG. 2E. When the equipment operation state is idle, the corresponding equipment icon 230 may display, for example, a "square", which may refer to the display manner of FIG. 2E. When the equipment operation state is malfunction, the corresponding equipment icon 230 may display, for example, a "triangle", which may refer to the display manner of FIG. 2E.

In another embodiment of the present invention, when the equipment operation state is shutdown, the corresponding equipment icon 230 may display, for example, a symbol "X", which may refer to the display manner of FIG. 2E. When the equipment operation state is normal operation, the corresponding equipment icon 230 may display, for example, a symbol "V", which may refer to the display manner of FIG. 2E. When the equipment operation state is idle, the corresponding equipment icon 230 may display, for example, a symbol "O", which may refer to the display manner of FIG. 2E. When the equipment operation state is malfunction, the corresponding equipment icon 230 may display, for example, a symbol "?", which may refer to the display manner of FIG. 2E.

The color, the number, the shape or the symbol mentioned above is only an embodiment of the embodiments of the present invention, and is not intended to limit the embodiments of the present invention. The user may adjust other colors, other numbers, other shapes or other symbols according the requirements thereof, and the adjustments belong to the protection scope of the embodiment of the present invention. In addition, the position of the number "1" displayed on the grid 211_57 in FIG. 2E is only an embodiment of the embodiments of the present invention, but is not intended to limit the embodiments of the present invention. The user may adjust the display position of the number "1" according to the requirements thereof, and the adjustment belongs to the protection scope of the embodiment of the present invention.

Therefore, the user may know the current equipment operation state of the practical equipment through the color, the number, the shape or the symbol displayed on the equipment icon 230, thereby effectively monitoring and managing the equipment and increasing the convenience of use.

Furthermore, the equipment monitoring management system 100 further includes storage equipment 150. The storage equipment 150 may store the above set files, the number of grids 211_11 to 211_MN and the corresponding first coordinate values thereof. The storage equipment 150 may also store a corresponding relationship of the equipment identifier, the coordinate, the equipment name, the equipment model, the equipment supplier, the equipment icon, the production line number and the grid 211_11 to 211_MN.

The user may operate the processor 130 to access the storage equipment 150 and display the messages in the storage equipment 150 through the display equipment 140, thereby querying the messages corresponding to the equipment and effectively monitoring and managing the equipment. In some embodiments, the storage equipment 150 may be a storage device, such as a random access memory (RAM), a read-only memory (ROM), a hard disk, a solid-state disk, etc.

In addition, in FIG. 2A and FIG. 2B, each of the production lines corresponding to the site layout of the factory are indicated by a long strip with diagonal lines. In the embodiment, the production line may be generated in a manner similar to the operation manner of the editing interface 220 described above and the production line is added on corresponding position of the base map 210. Alternatively, the user draws the site layout of the factory including the production line position, and the site layout of the factory is transformed to a file and then imported, so that the site layout of the factory is overlapped with the base map 210, so as to display the production line on the corresponding position of the base map 210. Alternatively, when the picture layer generator 110 generates the base map 210, each of the production lines is directly produced on the base map 210 through long strips to form a part of the base map 210.

Furthermore, in the above embodiments, the user may perform the editing operation through the editing interface 220 provided by the setting device 120, so as to correspondingly generate the set file to the processor 130. Accordingly, the processor 130 generates the equipment icon 230 according to the set file and determines the position of the equipment icon 230, so that the equipment icon 230 is displayed on the corresponding grid. However, the embodiments of the present invention are not limited thereto. The editing interface 220 of the setting equipment 120 may also directly present the equipment icon 230 corresponding to the equipment identifier, the user may place the equipment icon 230 on the corresponding grid by dragging the mouse cursor of the mouse, thereby achieving the same display effect and increasing the convenience of use.

Figure 3:
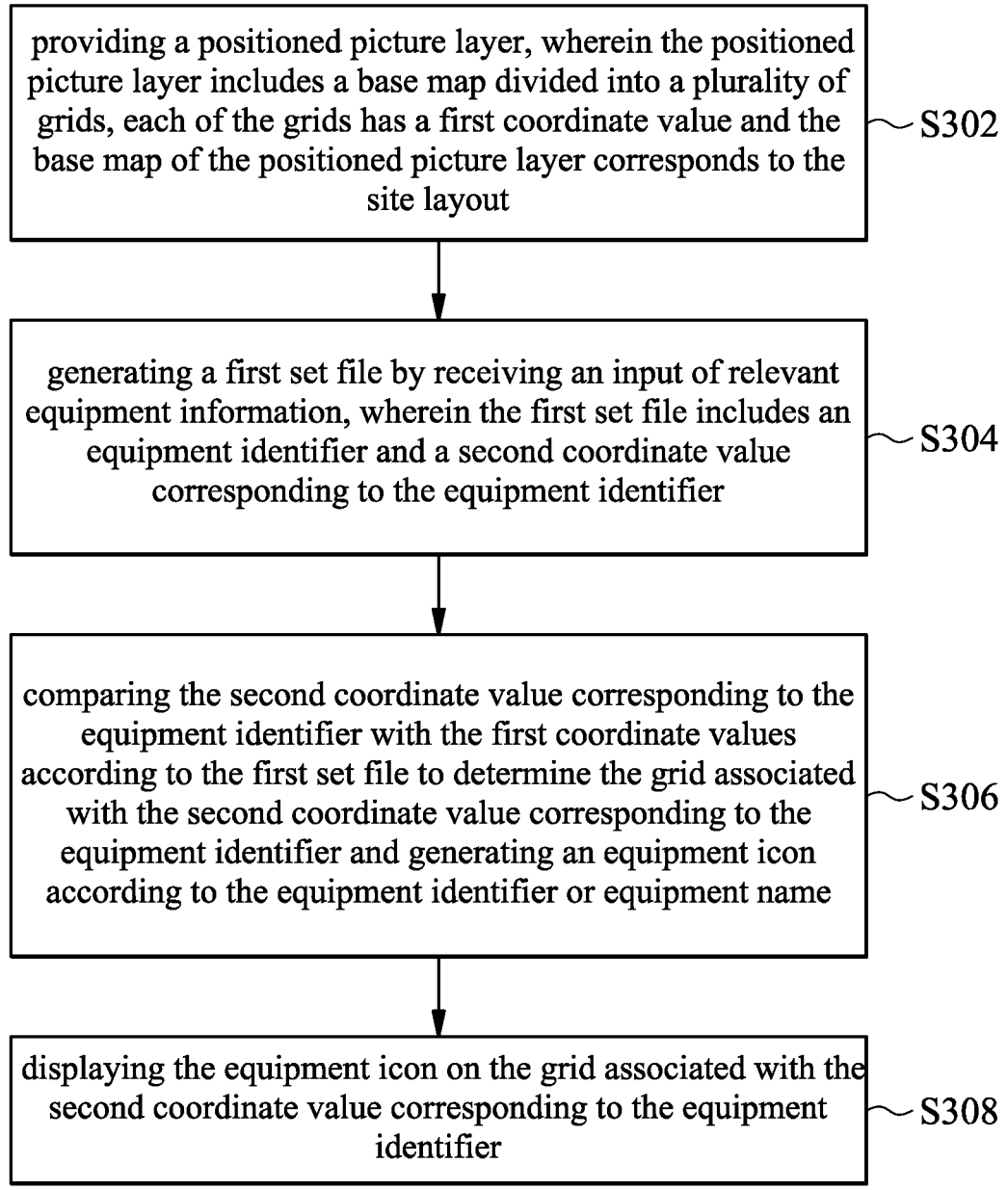
FIG. 3 shows a flowchart of an equipment monitoring management method according to an embodiment of the present invention.

According to the above-mentioned description, the embodiment of the present invention additionally provides an equipment monitoring management method. FIG. 3 shows a flowchart of an equipment monitoring management method according to an embodiment of the present invention. In step S302, the method involves providing a positioned picture layer, wherein the positioned picture layer includes a base map divided into a plurality of grids, each of the grids has a first coordinate value and the base map of the positioned picture layer corresponds to the site layout.

In step S304, the method involves generating a first set file by receiving an input of relevant equipment information, wherein the first set file includes an equipment identifier and a second coordinate value corresponding to the equipment identifier. In step S306, the method involves comparing the second coordinate value corresponding to the equipment identifier with the first coordinate values according to the first set file to determine the grid associated with the second coordinate value corresponding to the equipment identifier and generating an equipment icon according to the equipment identifier or equipment name. In step S308, the method involves displaying the equipment icon on the grid associated with the second coordinate value corresponding to the equipment identifier.

Figure 4:
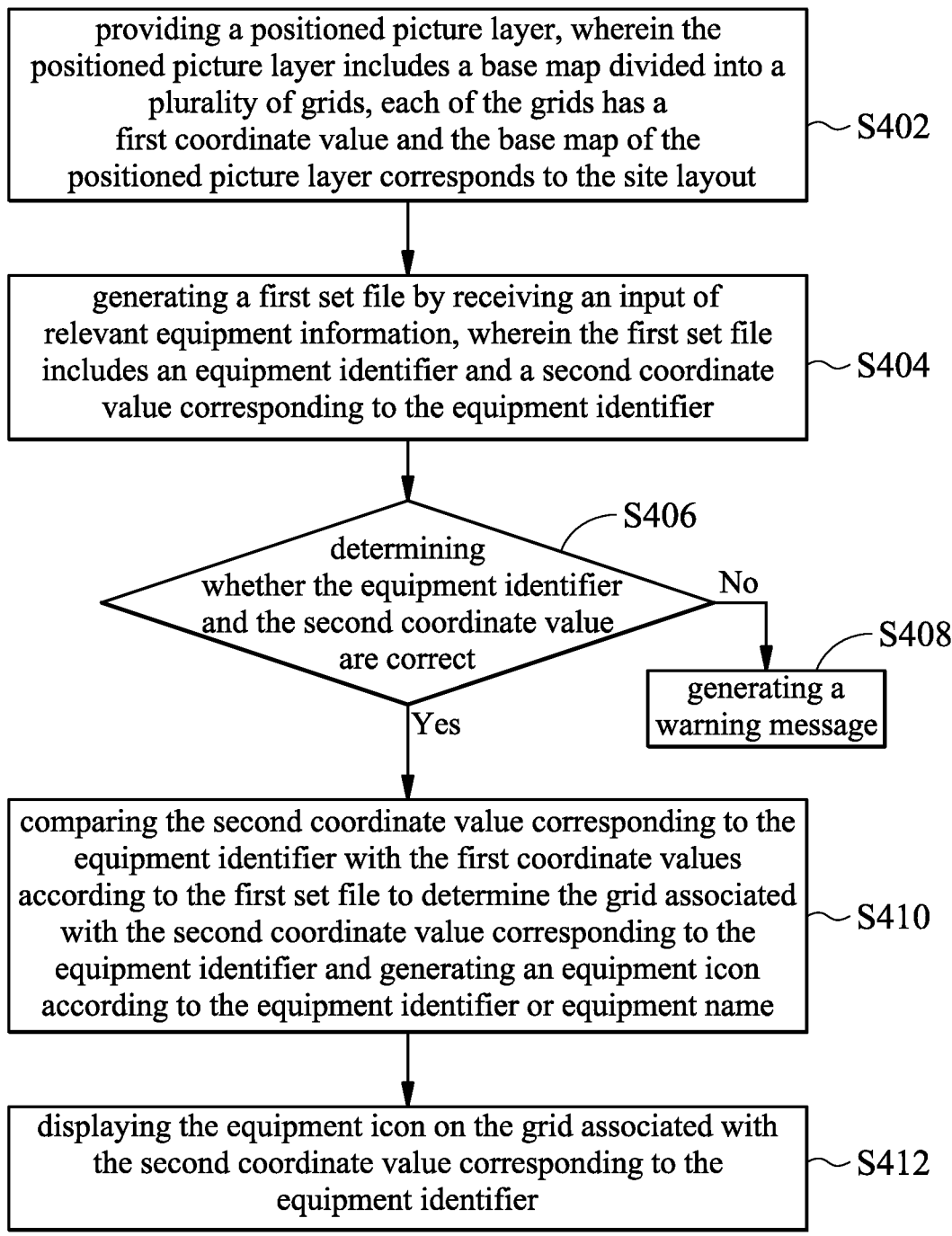
FIG. 4 shows a flowchart of an equipment monitoring management method according to another embodiment of the present invention.

FIG. 4 shows a flowchart of an equipment monitoring management method according to another embodiment of the present invention. In the embodiment, the steps S402, S404, S410 and S412 are equal to or similar to the steps S302, S304, S306 and S308 in FIG. 3, and their operation may refer to the embodiment in FIG. 3 and the descriptions thereof are not repeated herein.

In step S406, the method involves determining whether the equipment identifier and the second coordinate value are correct. When determining that the equipment identifier and/or the second coordinate value are incorrect, the method enters to step S408 in response to the incorrect equipment identifier and/or the incorrect second coordinate value. In the step S408, the method involves generating a warning message. When determining that the equipment identifier and the second coordinate value are correct, the method enters to step S410 in response to the correct equipment identifier and the correct second coordinate value.

Figure 5:
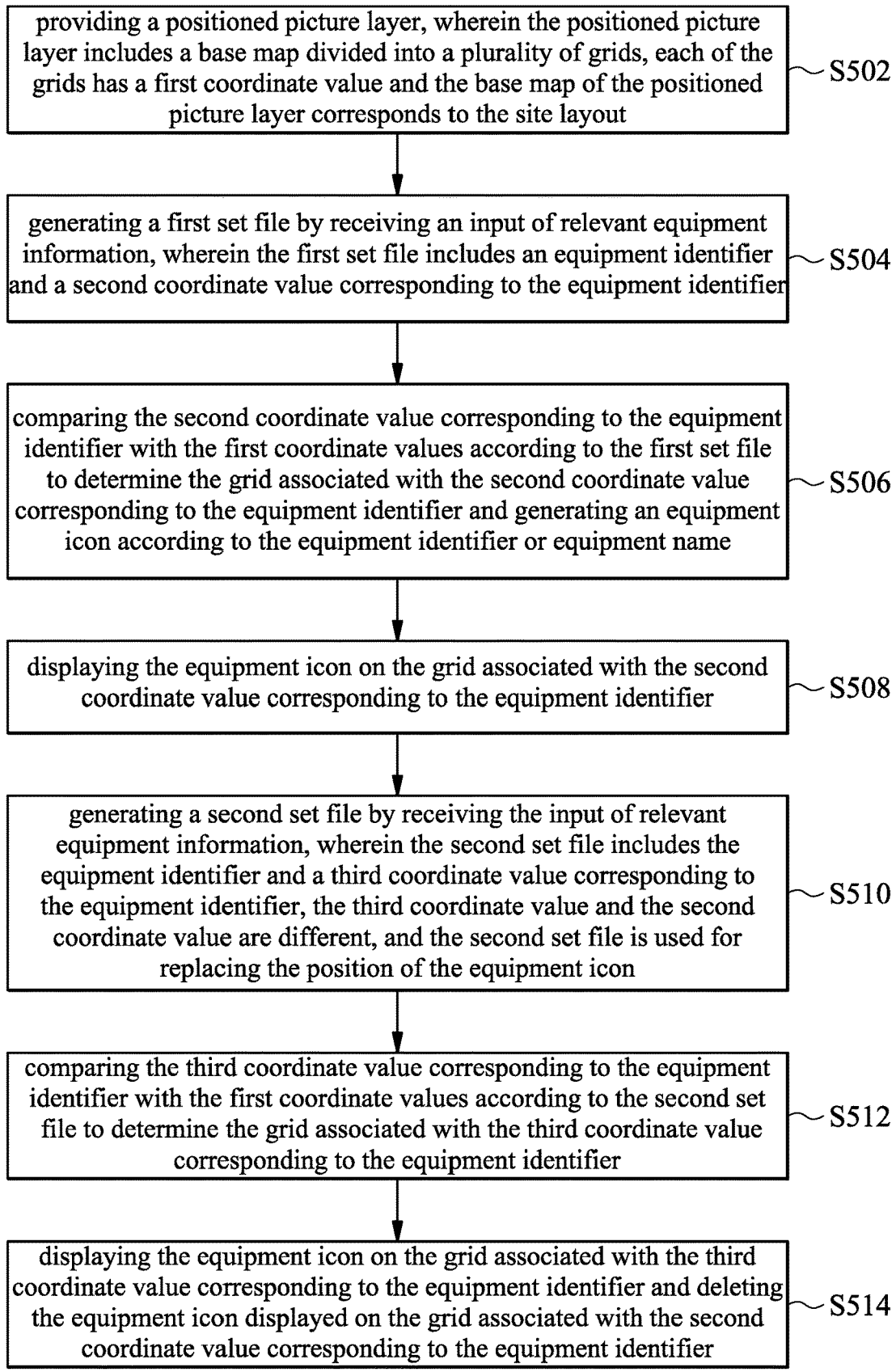
FIG. 5 shows a flowchart of an equipment monitoring management method according to another embodiment of the present invention.

FIG. 5 shows a flowchart of an equipment monitoring management method according to another embodiment of the present invention. In the embodiment, the steps S502, S504, S506 and S508 are equal to or similar to the steps S302, S304, S306 and S308 in FIG. 3, and their operation may refer to the embodiment in FIG. 3 and the descriptions thereof are not repeated herein.

In step S510, the method involves generating a second set file by receiving the input of relevant equipment information. The second set file includes the equipment identifier and a third coordinate value corresponding to the equipment identifier, the third coordinate value and the second coordinate value are different. The second set file is used for replacing the position of the equipment icon. In step S512, the method involves comparing the third coordinate value corresponding to the equipment identifier with the first coordinate values according to the second set file to determine the grid associated with the third coordinate value corresponding to the equipment identifier. In step S514, the method involves displaying the equipment icon on the grid associated with the third coordinate value corresponding to the equipment identifier and deleting the equipment icon displayed on the grid associated with the second coordinate value corresponding to the equipment identifier.

Figure 6:
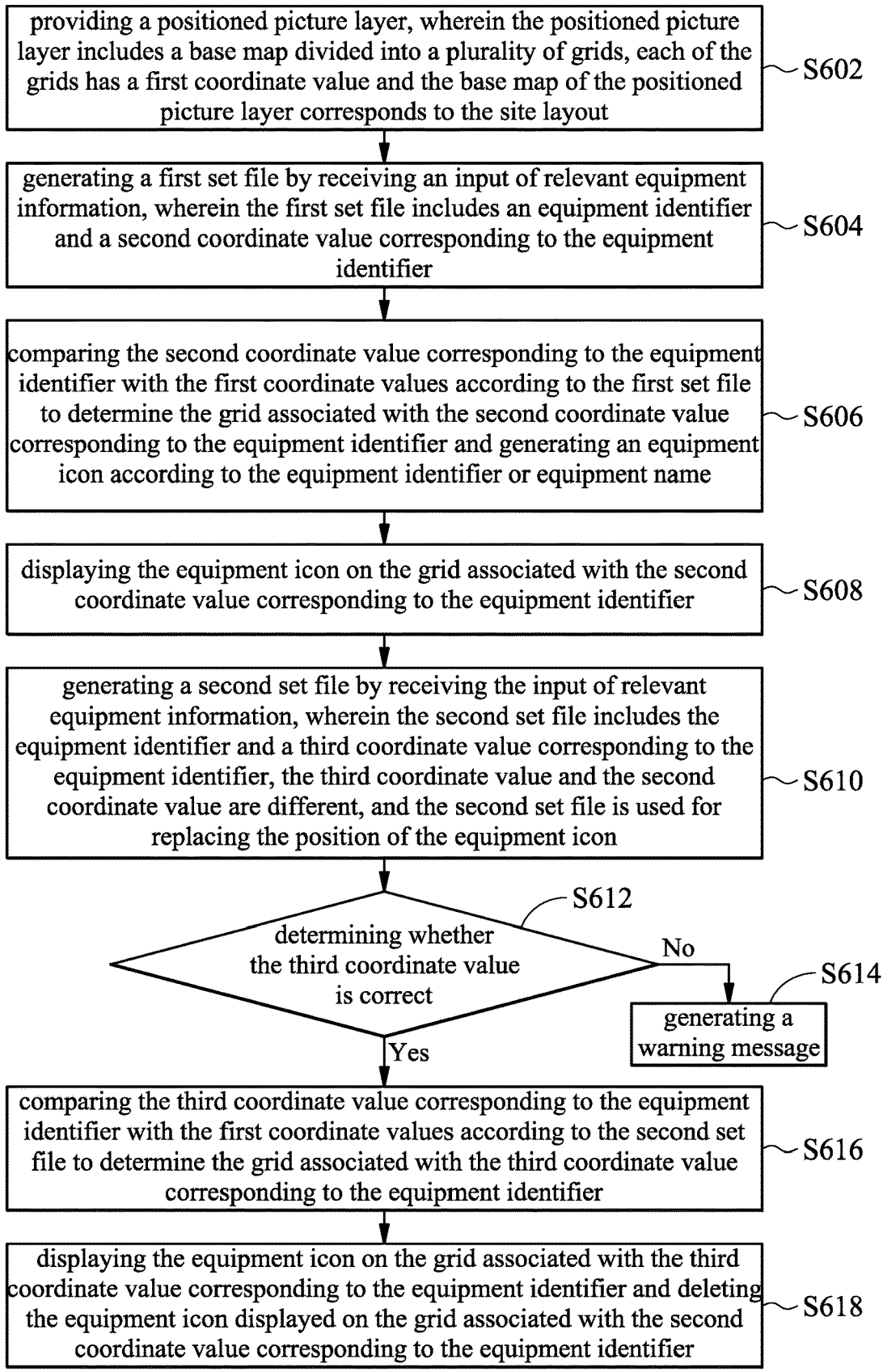
FIG. 6 shows a flowchart of an equipment monitoring management method according to another embodiment of the present invention.

FIG. 6 shows a flowchart of an equipment monitoring management method according to another embodiment of the present invention. In the embodiment, the steps S602, S604, S606, S608, S610, S616 and S618 are equal to or similar to the steps S502, S504, S506, S508, S510, S512 and S514 in FIG. 5, and their operation may refer to the embodiment in FIG. 5 and the descriptions thereof are not repeated herein.

In step S612, the method involves determining whether the third coordinate value is correct. When determining that the third coordinate value is incorrect, the method enters step S614 in response to the incorrect third coordinate value. In the step S614, the method involves generating a warning message. When determining that the third coordinate value is correct, the method enters the step S616 in response to the correct third coordinate value.

Figure 7:
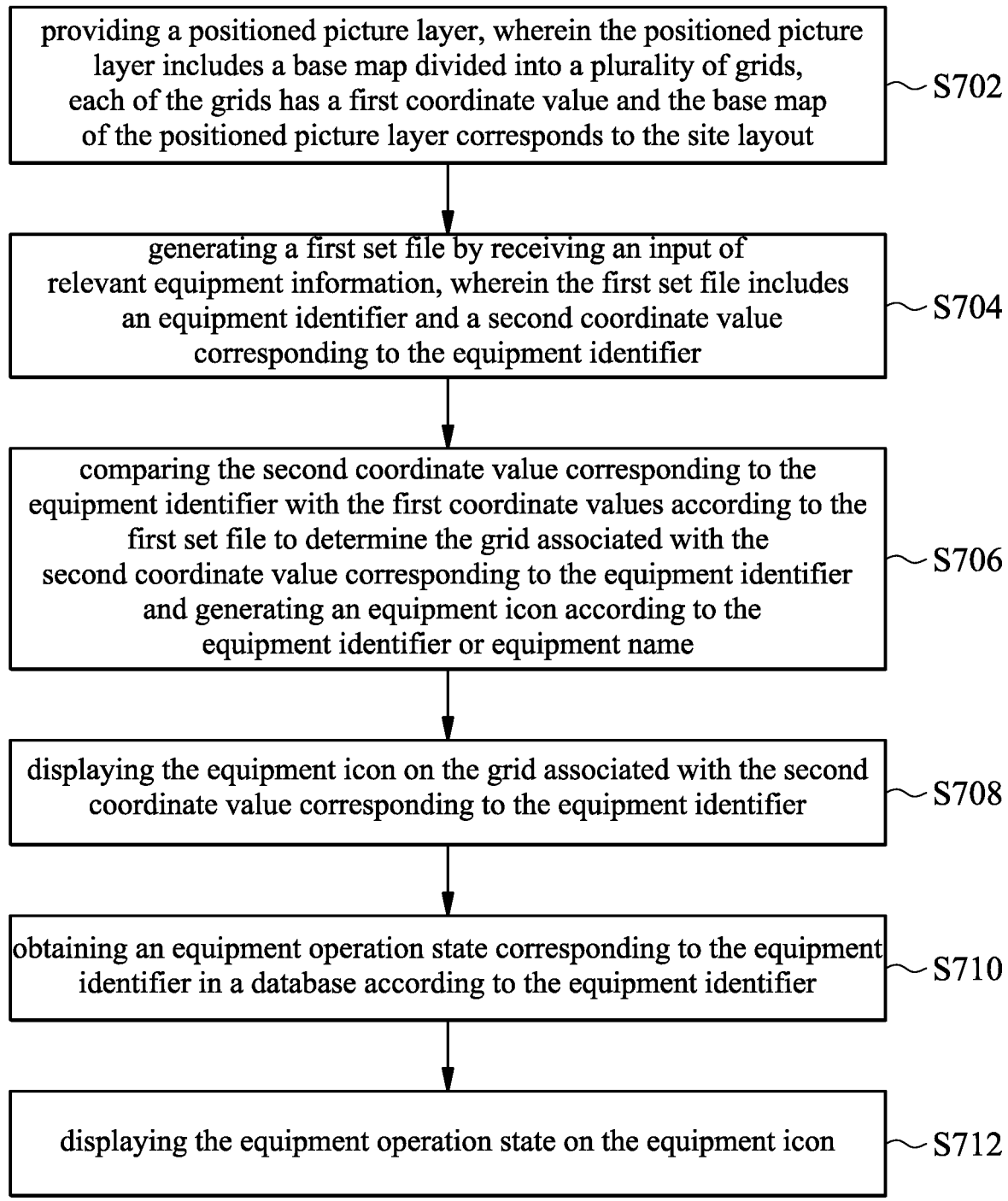
FIG. 7 shows a flowchart of an equipment monitoring management method according to another embodiment of the present invention.

FIG. 7 shows a flowchart of an equipment monitoring management method according to another embodiment of the present invention. In the embodiment, the steps S702, S704, S706 and S708 are equal to or similar to the steps S302, S304, S306 and S308 in FIG. 3, and their operation may refer to the embodiment in FIG. 3 and the descriptions thereof are not repeated herein.

In step S710, the method involves obtaining an equipment operation state corresponding to the equipment identifier in a database according to the equipment identifier. In step S712, the method involves displaying the equipment operation state on the equipment icon. In the embodiment, the step S712 includes displaying the equipment operation state on the equipment icon through a color, a number, a shape or a symbol.

In summary, according to the equipment monitoring management method and system, the positioned picture layer including the base map divided into a plurality of grids is provided and each of the grids has a first coordinate value. The first set file including the equipment identifier and the second coordinate value corresponding to the equipment identifier is provided. The second coordinate value corresponding to the equipment identifier is compared with the first coordinate values according to the first set file to determine the grid associated with the second coordinate value corresponding to the equipment identifier. The equipment icon is generated according to the equipment identifier or the equipment name. The equipment icon is displayed on the grid associated with the second coordinate value corresponding to the equipment identifier.

In addition, the embodiments of the present invention may also generate the warning message in response to the wrong equipment identifier and the wrong coordinate value and another set file may be provided to replace the position of the equipment icon. Furthermore, the equipment operation state may be displayed on the equipment icon. Therefore, the flexibility and timeliness of the equipment monitoring and management may be effectively increased and the convenience of the use is increased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An equipment monitoring management method, comprising:
    providing a positioned picture layer, wherein the positioned picture layer comprises a base map divided into a plurality of grids, each of the grids has a first coordinate value and the base map of the positioned picture layer corresponds to a site layout;
    generating a first set file by receiving an input of relevant equipment information, wherein the first set file comprises an equipment identifier, an equipment name, and a second coordinate value corresponding to the equipment identifier;
    comparing the second coordinate value corresponding to the equipment identifier with the first coordinate values according to the first set file to determine the grid associated with the second coordinate value corresponding to the equipment identifier;
    generating an equipment icon according to the equipment identifier or the equipment name comprised in the first set file; and
    displaying the equipment icon on the grid associated with the second coordinate value corresponding to the equipment identifier according to a comparison result of comparing the second coordinate value corresponding to the equipment identifier with the first coordinate values.

2. The equipment monitoring management method as claimed in claim 1, wherein the step of comparing the second coordinate value corresponding to the equipment identifier with the first coordinate values according to the first set file to determine the grid associated with the second coordinate value corresponding to the equipment identifier, and generating the equipment icon according to the equipment identifier or the equipment name comprises:
    determining whether the equipment identifier and the second coordinate value are correct;
    generating a warning message in response to the incorrect equipment identifier and/or the incorrect second coordinate value; and
    comparing the second coordinate value corresponding to the equipment identifier with the first coordinate values according to the first set file to determine the grid associated with the second coordinate value corresponding to the equipment identifier, and generating the equipment icon according to the equipment identifier or equipment name in response the correct equipment identifier and the correct second coordinate value.

3. The equipment monitoring management method as claimed in claim 2, wherein the correct equipment identifier and the correct second coordinate value comprise the equipment identifier conformed to a pre-stored identifier of a database, the second coordinate value that is not used and the second coordinate value that is located in the base map.

4. The equipment monitoring management method as claimed in claim 1, further comprising:
    generating a second set file by receiving the input of relevant equipment information, wherein the second set file comprises the equipment identifier and a third coordinate value corresponding to the equipment identifier, the third coordinate value and the second coordinate value are different, and the second set file is used for replacing the position of the equipment icon;
    comparing the third coordinate value corresponding to the equipment identifier with the first coordinate values according to the second set file to determine the grid associated with the third coordinate value corresponding to the equipment identifier; and
    displaying the equipment icon on the grid associated with the third coordinate value corresponding to the equipment identifier and deleting the equipment icon displayed on the grid associated with the second coordinate value corresponding to the equipment identifier.

5. The equipment monitoring management method as claimed in claim 4, wherein the step of comparing the third coordinate value corresponding to the equipment identifier with the first coordinate values according to the second set file to determine the grid associated with the third coordinate value corresponding to the equipment identifier comprises:
    determining whether the third coordinate value is correct;
    generating a warning message in response to the incorrect third coordinate value; and
    comparing the third coordinate value corresponding to the equipment identifier with the first coordinate values according to the second set file to determine the grid associated with the third coordinate value corresponding to the equipment identifier in response to the correct third coordinate value.

6. The equipment monitoring management method as claimed in claim 5, wherein the correct third coordinate value comprises the third coordinate value that is not used and the third coordinate value that is located in the base map.

7. The equipment monitoring management method as claimed in claim 1, further comprising:
    obtaining an equipment operation state corresponding to the equipment identifier in a database according to the equipment identifier; and
    displaying the equipment operation state on the equipment icon.

8. The equipment monitoring management method as claimed in claim 7, wherein the step of displaying the equipment operation state on the equipment icon comprises:
    displaying the equipment operation state on the equipment icon through a color, a number, a shape or a symbol.

9. The equipment monitoring management method as claimed in claim 8, wherein the equipment operation state comprises at least one of the following: shutdown, normal operation, idle and malfunction.

10. The equipment monitoring management method as claimed in claim 1, wherein the equipment identifier is a unique identifier or a property number of equipment.

11. An equipment monitoring management system, comprising:
    a picture layer generator, configured to provide a positioned picture layer, wherein the positioned picture layer comprises a base map divided into a plurality of grids, each of the grids has a first coordinate value and the base map of the positioned picture layer corresponds to a site layout;
    a setting equipment, configured to generate a first set file by receiving an input of relevant equipment information, wherein the first set file comprises an equipment identifier, an equipment name, and a second coordinate value corresponding to the equipment identifier;
    a processor, configured to compare the second coordinate value corresponding to the equipment identifier with the first coordinate values according to the first set file to determine the grid associated with the second coordinate value corresponding to the equipment identifier, and generate an equipment icon according to the equipment identifier or the equipment name comprised in the first set file; and display equipment, configured to display the equipment icon on the grid associated with the second coordinate value corresponding to the equipment identifier according to a comparison result of comparing the second coordinate value corresponding to the equipment identifier with the first coordinate values.

12. The equipment monitoring management system as claimed in claim 11, wherein the processor further determines whether the equipment identifier and the second coordinate value are correct, the processor generates a warning message in response to the incorrect equipment identifier and/or the incorrect second coordinate value, and the processor compares the second coordinate value corresponding to the equipment identifier with the first coordinate values according to the first set file to determine the grid associated with the second coordinate value corresponding to the equipment identifier, and generates an equipment icon according to the equipment identifier or equipment name in response the correct equipment identifier and the correct second coordinate value.

13. The equipment monitoring management system as claimed in claim 12, wherein the correct equipment identifier and the correct second coordinate value comprise the equipment identifier conformed to a pre-stored identifier of a database, the second coordinate value which is not used and the determination that the second coordinate value is located in the base map.

14. The equipment monitoring management system as claimed in claim 11, wherein the setting equipment further generates a second set file by receiving the input of relevant equipment information, wherein the second set file comprises the equipment identifier and a third coordinate value corresponding to the equipment identifier, the third coordinate value and the second coordinate value are different, and the second set file is used for replacing the position of the equipment icon, and the processor further compares the third coordinate value corresponding to the equipment identifier with the first coordinate values according to the second set file to determine the grid associated with the third coordinate value corresponding to the equipment identifier and controls the display equipment to display the equipment icon on the grid associated with the third coordinate value corresponding to the equipment identifier and delete the equipment icon displayed on the grid associated with the second coordinate value corresponding to the equipment identifier.

15. The equipment monitoring management system as claimed in claim 14, wherein the processor further determines whether the third coordinate value is correct, the processor generates a warning message in response to the incorrect third coordinate value, and the processor compares the third coordinate value corresponding to the equipment identifier with the first coordinate values according to the second set file to determine the grid associated with the third coordinate value corresponding to the equipment identifier in response to the correct third coordinate value, so as to control the display equipment to display the equipment icon on the grid associated with the third coordinate value corresponding to the equipment identifier and delete the equipment icon displayed on the grid associated with the second coordinate value corresponding to the equipment identifier.

16. The equipment monitoring management system as claimed in claim 15, wherein the correct third coordinate value comprises the third coordinate value that is not used and the determination that the third coordinate value is located in the base map.

17. The equipment monitoring management system as claimed in claim 11, wherein the processor further obtains an equipment operation state corresponding to the equipment identifier in a database according to the equipment identifier and controls the display equipment to display the equipment operation state on the equipment icon.

18. The equipment monitoring management system as claimed in claim 17, wherein the equipment operation state is displayed on the equipment icon through a color, a number, a shape or a symbol.

19. The equipment monitoring management system as claimed in claim 18, wherein the equipment operation state comprises at least one of the following: shutdown, normal operation, idle and malfunction.

20. The equipment monitoring management system as claimed in claim 11, further comprising:

storage equipment, configured to store the number of grids, the first coordinate values corresponding to the grids, and a corresponding relationship of the equipment identifier, the second coordinate value and the grids corresponding to the equipment identifier.

21. The equipment monitoring management system as claimed in claim 11, wherein the equipment identifier is a unique identifier or the property number of the equipment.

* * * * *